Patented Mar. 13, 1951

2,545,044

UNITED STATES PATENT OFFICE 2,545,044

METHOD OF PREPARING AN α-METH-ACRYLOXY PROPIONAMIDE

Delbert D. Reynolds and William O. Kenyon, Rochester, N. Y., assignors to Eastman Kodak Company, Rochester, N. Y., a corporation of New Jersey No Drawing. Application November 22, 1947, Serial No. 787,605

3 Claims. (Cl. 260—486)

This invention relates to a process for esterifying a compound containing an esterifiable hydroxyl group with a carboxylic acid halide.

In the synthesis of organic esters, it is advantageous in many cases to employ a carboxylic acid halide as the acylating agent. While this process of acylation is quite satisfactory for the synthesis of saturated organic esters, it does not work well with unsaturates for several reasons. If the reaction is carried out in the absence of an acceptor for the hydrogen halide generated as a by-product, the hydrogen halide often adds to the double bond of the unsaturate. Even where the addition reaction occurs only to an extent insufficient to affect adversely the yield of unsaturate, the product is so contaminated with hydrogen halide as to retard the subsequent polymerization of the unsaturate so produced. When an acceptor such as an organic base is used, the acyl halide frequently reacts therewith and such side reactions interfere seriously with the course of the reaction and the purification of the product. In the case where the reaction goes well, purification of the product to remove the organic bases present must be very thorough if the monomer is to be polymerized, as such nitrogenous substances are strong polymerization inhibitors. Where the acceptor is a reactive inorganic acid-binding agent, reaction with the hydrogen halide generates water which then reacts with the acyl halide and impairs its efficiency as an acylating agent.

This invention has as its object the preparation of unsaturated organic esters by a new and improved method which overcomes all of the above-mentioned disadvantages of the prior art. Another object is to provide a commercially practical process for the preparation of unsaturated organic esters. Still another object is to provide a method for preparing new and useful organic unsaturates. Other objects will become apparent hereinafter.

These objects are accomplished by the conjoint use of an inorganic acid-binding agent and an inorganic dehydrating agent in the acylating mixture, in the process of acylating an alcohol with an acyl halide, wherein the alcohol or the acyl halide or both contain an ethylenic unsaturation. The term alcohol is used to denote any organic compound having one or more hydroxyl groups capable of acylation.

In accordance with the invention the acyl halide may be a saturated carboxylic acid halide (e. g. acetyl chloride, propionyl chloride, butyryl chloride, adipyl chloride, succinyl chloride, phthalyl chloride, benzoyl chloride, naphthoyl chloride, benzene sulfonylchloride, N-diethyl carbamyl chloride, etc.), or an unsaturated carboxylic acid halide (e. g. fumaryl chloride, maleyl chloride, acrylyl chloride, acrylyl bromide, methacrylyl chloride, etc.). The alcohols which may be esterified by the acid halides and process of the invention include monohydroxy alcohols (e. g. methyl, ethyl, propyl, isopropyl, n-butyl, isobutyl, sec.-butyl, n-decyl, allyl, methallyl, 2-chloroallyl, benzyl alcohols, etc., and phenol, naphthol, etc.) polyhydroxy alcohols (e. g. ethylene glycol, propylene glycol, butylene glycol, trimethylene glycol, pentamethylene glycol, glycerine, methyl glycerol, erythritol, resorcinol, etc.), the hydroxy acids (e. g. tartaric acid, maleic acid, tartronic acid, glycolic acid, lactic acid, citric acid, hydracrylic acid, hydroxybutyric acids, salicylic acid, etc.), the alkyl esters and amides of the above hydroxyacids (e. g. the methyl, ethyl, propyl, isopropyl, n-butyl, isobutyl, sec.-butyl and allyl esters, and the amides and N-alkyl substituted amides), wherein the alkyl group is as above indicated.

The acid-binding agent employed in the invention may be an anhydrous carbonate (e. g. sodium carbonate, potassium carbonate, calcium carbonate, etc.), a substantially water-free alkali metal hydroxide (e. g. sodium hydroxide, potassium hydroxide, etc.). The dehydrating agent is a compound which is not an acid-binding agent such as anhydrous calcium sulfate, anhydrous magnesium sulfate or anhydrous sodium sulfate, etc.

In the usual practice of the invention, the alcohol is mixed together with the anhydrous acid-binding agent and the dehydrating agent in an inert liquid such as benzene, methyl acetate, toluene, chloroform or dioxane, etc., and preferably in the presence of a small amount of an added polymerization inhibitor such as hydroquinone, copper carbonate, copper borate, and similar compounds. While mechanically agitating the mixture, there is added the acyl halide at a rate sufficient to maintain the reaction mixture preferably at 30° to 55° C. After completion of the reaction, the product can be recovered in pure form by the usual methods of extraction, washing, fractionation, crystallization, etc.

The unsaturated compounds produced in accordance with the invention are valuable intermediates for the preparation of other chemical compounds, and are polymerizable alone or conjointly with other unsaturated compounds to give valuable resinous products.

The following examples serve to illustrate further our new process of acylation for the preparation of unsaturated organic esters.

*Example 1.—Di-(α-carbethoxyethyl) fumarate*

250 gms. of anhydrous benzene, 240 gms. of ethyl lactate, 100 gms. of powdered anhydrous calcium sulfate and 160 gms. of anhydrous sodium carbonate were stirred together for one hour in a three-necked flask equipped with a mechanical stirrer, a dropping funnel and a thermometer. The flask was kept in an ice bath. There was then added 150 gms. of fumaryl chloride at such rate as to keep the reaction temperature at less than 30° C. The mixture was stirred for an additional 15 hours and poured into 3 liters of agitated cold water. The mixture was then filtered, the benzene layer separated and washed with water. The benzene was removed by vacuum distillation. The residue was distilled from a low pressure butyl phthalate type still. The main fraction of 87 gms. boiled at 150° to 170° C. at 0.017 to 0.025 mm. pressure. Analysis of the above product gave 6.47 per cent by weight of hydrogen and 52.95 per cent by weight of carbon as compared with calculated theory of 6.33 per cent and 53.20 per cent, respectively. The structural formula of the product is as follows:

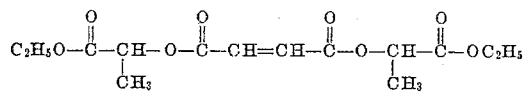

*Example 2. — Di-(α-carbmethallyloxyethyl) phthalate*

80 gms. of methallyl lactate, 100 c. c. of dry benzene, 42 gms. of anhydrous sodium carbonate, 30 gms. of anhydrous calcium sulfate, and 3 gms. of copper borate were stirred together for one hour in a three-necked flask equipped as described in Example 1. There were then added 56.5 gms. of phthalyl chloride at a rate sufficient to maintain the temperature of reaction at 52° C. After the addition of phthalyl chloride was complete, external heat was applied to the flask to keep the temperature at 52° C. and stirring continued for 15 hours. The reaction mixture was then poured into 3 liters of water, the benzene layer separated out, washed with water, the benzene flashed off and the residue fractionated. A yield of 38 gms. of the product was obtained. It had a boiling point of 170° C. at 0.03 mm. pressure. The analysis of this product gave by weight 6.41 per cent hydrogen and 62.96 per cent carbon, as compared with calculated theory of 6.20 per cent and 63.20 per cent, respectively. The product has the following structure:

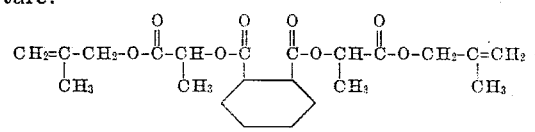

*Example 3.—Di-(α-carballyloxyethyl) fumarate*

A mixture of 70 gms. of allyl lactate, 75 gms. of anhydrous sodium carbonate, 75 gms. of anhydrous calcium sulfate, 3 gms. of copper carbonate and 300 c. c. of anhydrous benzene were reacted with 40 gms. of fumaryl chloride and the product isolated following the procedure described in Example 1. The product had a boiling point of 130° C. at 0.025 mm. pressure. Analysis of the product indicated that a substantially pure di-(α-carballyloxyethyl) fumarate had been obtained. It can be represented by the following structural formula:

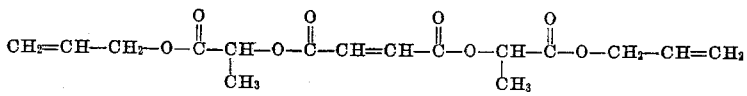

*Example 4.—Di-(2-carbomethoxyphenyl) fumarate*

152 gms. of methyl salicylate, 76.5 gms. of fumaryl chloride, 400 gms. of anhydrous calcium sulfate and 500 c. c. of dry benzene were placed in a 1-liter three-necked flask equipped with a mechanical stirrer, a dropping funnel and a thermometer. While stirring the reaction mixture, there were added 40 gms. of potassium hydroxide pellets at such rate as to keep the temperature of the reaction mixture at 50° C. or less. The mixture was stirred an additional two hours at room temperature. After standing for a period of about 18 hours, the mixture was filtered, and upon removing some of the benzene from the filtrate by evaporation, a crystalline product separated from solution. After recrystallization from ethanol, the product had a melting point of 144° to 145° C. Analysis of this product gave by weight 4.18 per cent hydrogen and 62.12 per cent carbon, as compared with calculated theory for these elements of 4.18 per cent and 62.50 per cent, respectively. The product can be represented by the following structural formula:

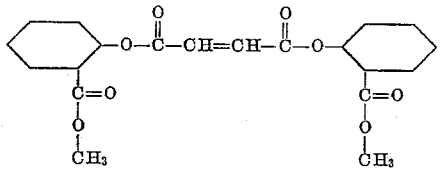

*Example 5.—α-methacryloxy propionamide*

250 gms. of lactamide, 375 gms. of anhydrous sodium carbonate, 375 gms. of powdered anhydrous calcium sulfate and 1500 c. c. of anhydrous methyl acetate were stirred together for one hour in a flask equipped with a mechanical stirrer, a dropping funnel and a thermometer. There were then added 260 gms. of methacrylyl chloride at such rate as to keep the temperature of the reaction mixture at about 40° C. The mixture was stirred for 7 hours longer time and then left at room temperature overnight. It was filtered and the filtrate blown down by a stream of dry air. A low boiling hydrocarbon solvent (boiling point 40°–61° C.) was added to the residue and the solution placed in a refrigerator. The product separated in the form of crystalline needles, which after recrystallization from ether had a melting point of 60°–61° C. The yield was 66 grams. Some polymeric material was obtained in the mother liquor.

*Example 6.—Di-(α-carbethoxyethyl) carbonate*

118 gms. of ethyl lactate, 75 gms. of anhydrous sodium carbonate, 50 gms. of anhydrous powdered calcium sulfate and 500 c. c. of anhydrous benzene were stirred together in a three-necked flask equipped with a mechanical stirrer, a dropping funnel and a thermometer. While keeping the flask in ice water, there were added 50 gms. of phosgene in 317 gms. of toluene at a rate sufficient to maintain the temperature between 0° and 30° C. After completing the addition of the phosgene, the temperature of the mixture was maintained at room temperature for about 18 hours, stirring during all this time. The mixture was then poured into 3 liters of agitated cold water, filtered and the benzene layer separated and washed with water. The benzene was removed by vacuum distillation and the residual product then fractionally distilled. Analysis of the product gave 50.4 per cent by weight of carbon and 7.0 per cent by weight of hydrogen as compared with calculated theory for these elements of 50.4 per cent by weight and 6.9 per cent by weight, respectively.

We claim:

1. A process for preparing an α-methacryloxy propionamide comprising condensing under anhydrous conditions methacrylyl chloride with an acid amide selected from the group consisting of lactamide and an N-alkyl lactamide wherein the alkyl group contains from 1 to 4 carbon atoms, in the presence of anhydrous sodium carbonate and in the presence of anhydrous calcium sulfate.

2. A process for preparing α-methacryloxy propionamide comprising condensing under anhydrous conditions methacrylyl chloride with lactamide, in the presence of anhydrous sodium carbonate and in the presence of anhydrous calcium sulfate.

3. A process for preparing N-ethyl α-methacryloxy propionamide comprising condensing under anhydrous reaction conditions methacrylyl chloride with ethyl lactamide, in the presence of anhydrous sodium carbonate and in the presence of anhydrous calcium sulfate.

DELBERT D. REYNOLDS.
WILLIAM O. KENYON.

REFERENCES CITED

The following references are of record in the file of this patent:

UNITED STATES PATENTS

| Number | Name | Date |
| --- | --- | --- |
| 1,951,782 | Bauer | Mar. 20, 1934 |
| 2,025,984 | Harris | Dec. 31, 1935 |
| 2,117,349 | Neher | May 17, 1938 |
| 2,238,030 | Bradley | Apr. 15, 1941 |
| 2,251,695 | Tucker | Aug. 5, 1941 |
| 2,345,006 | Ross et al. | Mar. 28, 1944 |
| 2,370,055 | Long | Feb. 20, 1945 |

FOREIGN PATENTS

| Number | Country | Date |
| --- | --- | --- |
| 496,892 | Great Britain | Dec. 7, 1938 |